C. Lehman,
Fruit Peeler.
No. 91,238.   Patented June 15, 1869.
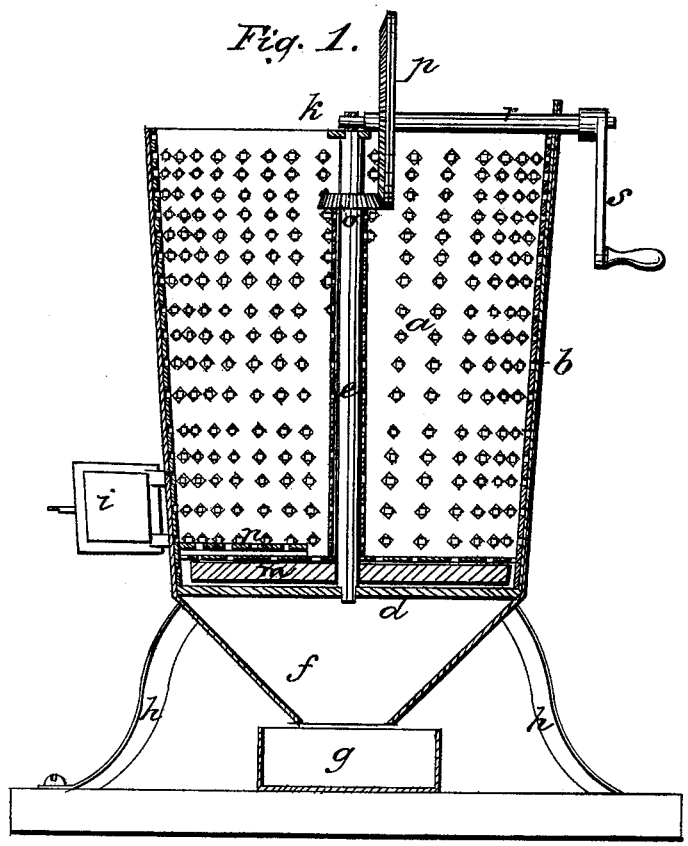
Witnesses.
E. W. Bliss
Jenny W. Bliss
Inventor.
Charles Lehmann

United States Patent Office.

CHARLES LEHMAN, OF HARTFORD, CONNECTICUT.

Letters Patent No. 91,238, dated June 15, 1869.

IMPROVED MACHINE FOR PEELING FRUIT.

The Schedule referred to in these Letters Patent and making part of the same.

*To all whom it may concern:*

Be it known that I, CHARLES LEHMAN, of Hartford, county of Hartford, and State of Connecticut, have invented certain new and useful Improvements in Machine for Peeling Fruit; and to enable others skilled in the art to make and use the same, I will proceed to describe its construction and operation, referring to the drawings, in which the same letters indicate like parts in each of the figures.

The nature of this invention consists of a cylindrical case, the inner surface of which has a roughened or cutting protuberance, either formed in or upon its inner surface, with a rotating or vibrating shaft, and diaphragm, also similarly constructed, which agitate the fruit against said rough surface, to remove the peel (except the pits) from the surface, and discharge the debris through a discharge-funnel into a receiver below.

In the accompanying drawings—

Figure 1 is a sectional side elevation.

Figure 2 is a view of a stare, showing one of the various ways of producing cutting-surface for removing the peel from fruit.

A is a cylinder, having a perforated rough inside surface, produced either by a stare-lining, sharp cutting-protuberances, produced by perforation or other proper means, whereby the inner surface shall be made to produce the desired effect.

$b$ is a case, in which the cylinder or stare-lining $c$ is arranged.

$d$ is a bottom of the cylinder, in which is formed a bearing or step for the shaft $e$.

$f$ is a funnel, which collects and discharges the debris into the receiver $g$.

$h$ are legs, which are secured to and support the case $b$.

$i$ is a door, formed in the body of the case, and near its lower end, to effect the discharge of the fruit after the work is accomplished.

$e$ is a shaft, which takes bearings in a step or box, on or in the bottom $d$, and in a bearing formed on or in the cross-bar $k$, the ends of which are secured to the sides of the case $b$.

$m$ is a disk, secured to the shaft $e$, near the lower end thereof.

This disk is also provided with one or more elevations, $n$, and roughened or cutting-surfaces, the object of which is to increase and facilitate the circulation of the fruit.

Impetus is given to the shaft $e$ by means of the gears $o\ p$, shaft and crank $r\ s$.

Thus it will be seen that fruit may be placed in the cylinder, and, by turning the diaphragm by the crank $s$, the fruit is agitated from side to side, and in a very short time the peel is removed therefrom.

I believe I have thus shown the nature, construction, and advantage of this invention so as to enable others skilled in the art to make and use the same therefrom.

What I claim, therefore, and desire to secure by Letters Patent, is—

The rough-surface cylinder $a$, with the diaphragm $m$ and operating-mechanism, constructed and arranged substantially as described, and for the purpose set forth.

CHARLES LEHMAN.

Witnesses:
   E. W. BLISS,
   JEREMY W. BLISS.